(No Model.) 3 Sheets—Sheet 2.
A. McDOUGALL.
APPARATUS FOR COOLING AND DRYING GRAIN.
No. 432,145. Patented July 15, 1890.
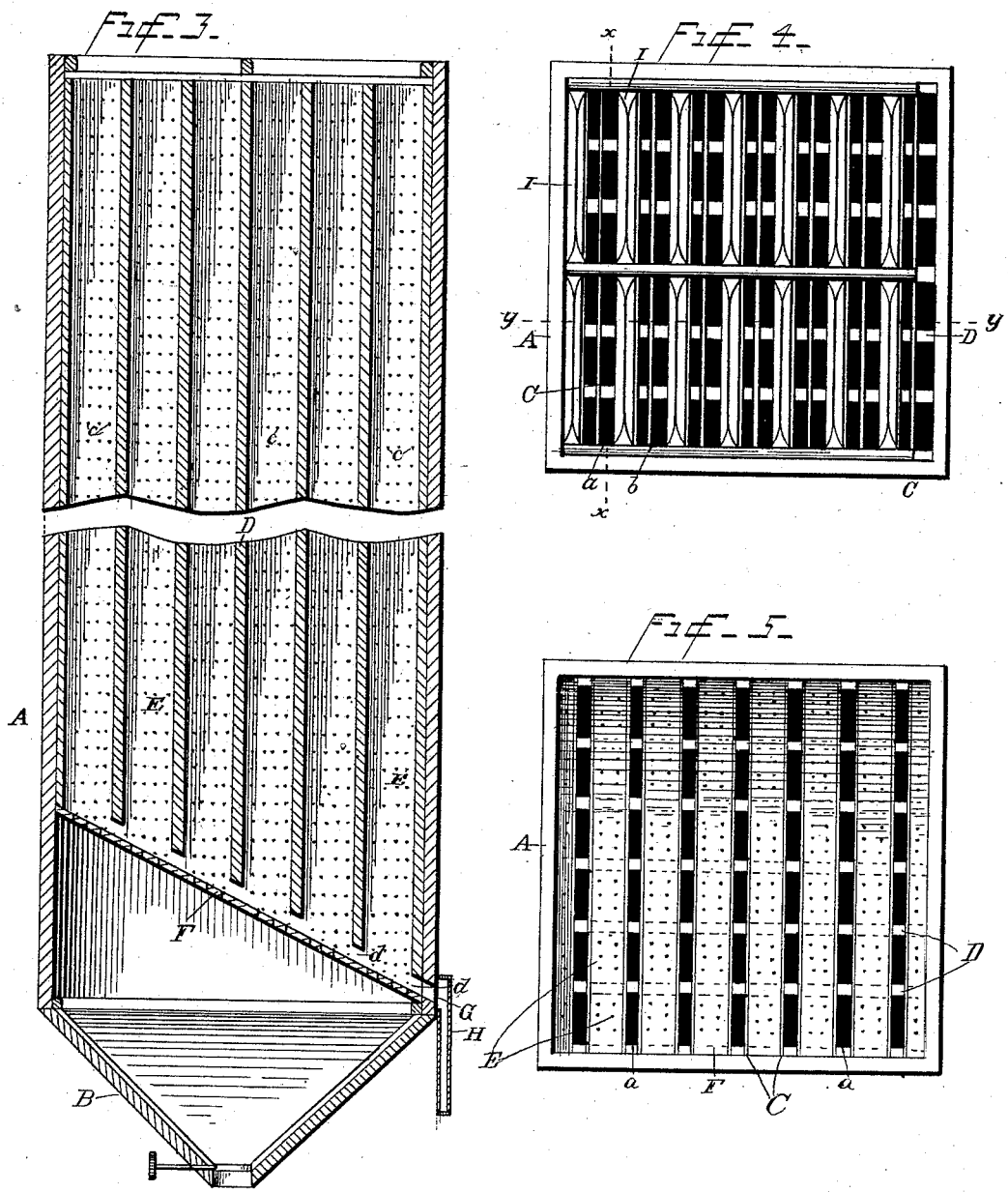
Witnesses
Norris A. Clark
Arthur A. Ent.
Inventor
Alexander McDougall
By his Attorney
Frank L. Dyer (No Model.) 3 Sheets—Sheet 3.
A. McDOUGALL.
APPARATUS FOR COOLING AND DRYING GRAIN.
No. 432,145. Patented July 15, 1890.
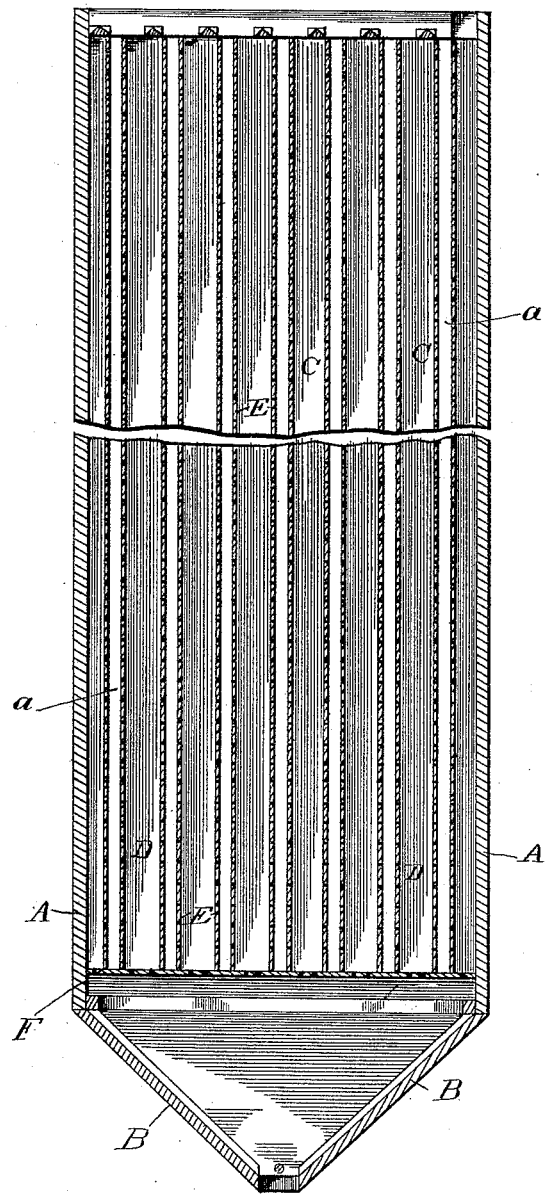
Witnesses.
Arthur A. Erb.
A. F. Middleton
Inventor.
Alexander McDougall
By his Attorney.
Frank L. Dyer

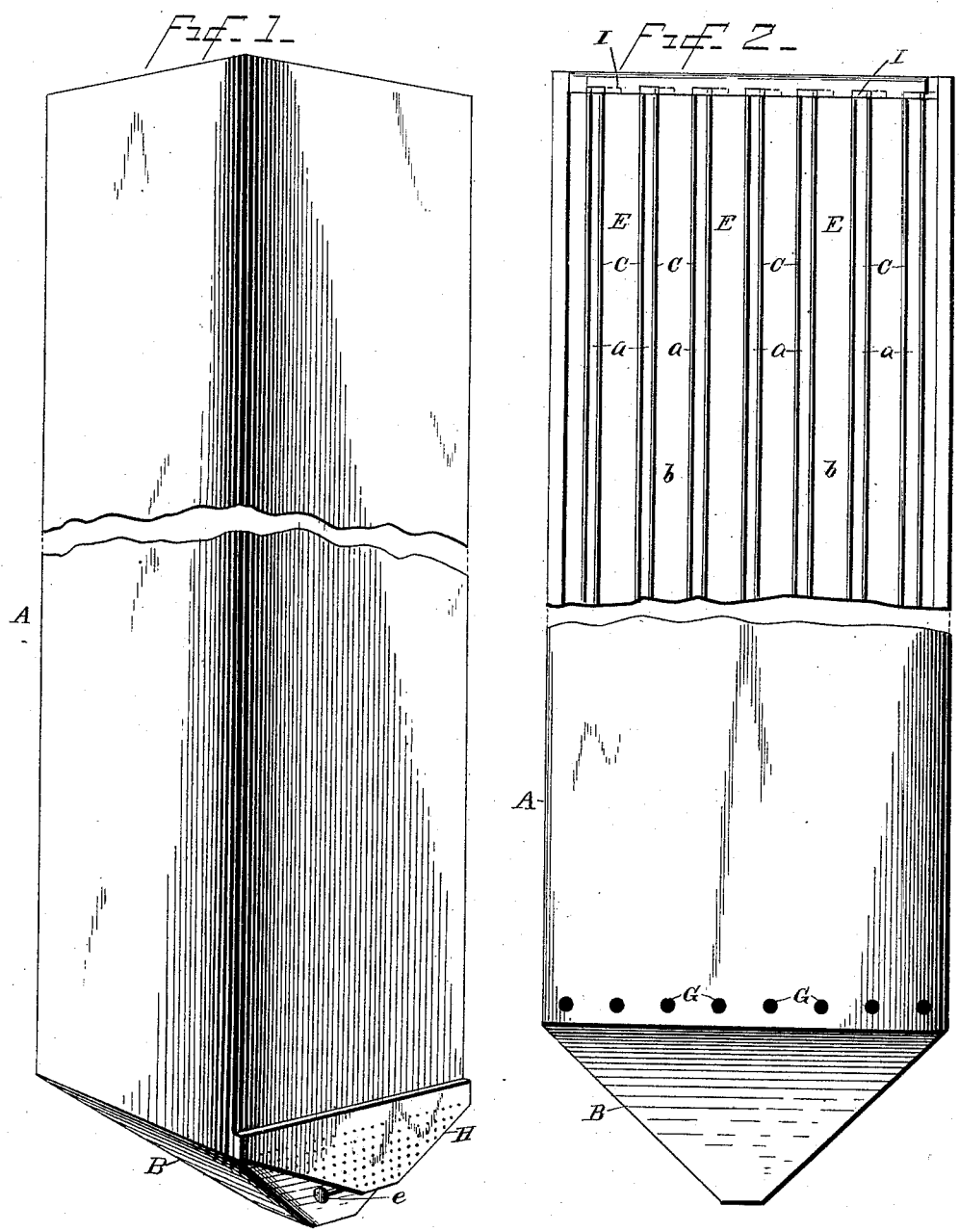

UNITED STATES PATENT OFFICE.

ALEXANDER McDOUGALL, OF DULUTH, MINNESOTA.

APPARATUS FOR COOLING AND DRYING GRAIN.

SPECIFICATION forming part of Letters Patent No. 432,145, dated July 15, 1890.

Application filed August 7, 1889. Serial No. 320,019. (No model.)

*To all whom it may concern:*

Be it known that I, ALEXANDER McDOUGALL, a citizen of the United States, residing at Duluth, in the county of St. Louis and State of Minnesota, have invented a new and useful Apparatus for Drying and Cooling Grain; and I do hereby declare that the following is a full and exact description of the same.

My invention relates to a new and improved apparatus for drying grain, and more particularly for drying shelled corn, and by means of which grain will be thoroughly and effectively dried within the elevator or within a suitable bin by natural or artificial means, and will always be kept cool and well ventilated under all ordinary conditions.

The invention interferes in no way with the usual recharging and discharging apparatus of the elevator, and is applicable for use with any of the well-known forms of elevators.

Heretofore in drying corn it has been the custom to place the corn on the cob within a long slatted crib, where it is subject to the drying effect of the atmosphere for a considerable length of time. When the corn is supposed to be dried, it is then shelled in the usual way and placed within the elevator for shipment. It often happens, however, that the corn is not thoroughly dry when it is removed from the cob, or that it becomes moistened during its transportation, so that when it is placed within the elevator it is in a dampened condition. When in this condition, fermentative action generally takes place and the corn begins to decay, so that it is greatly damaged, and is often rendered unfit for use, thereby incurring a considerable financial loss. Moreover, when the dampened corn is placed within the elevator, it begins to heat, and it sometimes becomes so hot as to char, thereby causing irretrievable damage to the corn. It will therefore be seen that the preliminary process of drying the corn is a slow one, and necessitates a crib in order that it may be carried on, and also, unless the corn is perfectly dry and free from all moisture when it is placed within the elevator-bin, that the corn is liable to decay and spoil, and, further, that this decaying process can only be checked at a considerable loss of time and expense, and, finally, that the presence of moisture in the corn within the elevator-bin is liable, for the reason before mentioned, to char and destroy the corn. The same is true in some other varieties of grain; but the damage caused by moisture in corn is most noticeable and dangerous.

I propose by means of my present invention to dry the shelled corn or other grain within the elevator or within a suitable bin erected for that purpose thoroughly and speedily, so that there can be no possibility of fermentative action taking place. I also propose, by means of my present invention, to keep the shelled corn or other grain within the elevator always cool and well ventilated, so that there can be no heat generated in the grain.

To this end my invention consists in applying to an ordinary elevator-bin certain new and novel features illustrated in the accompanying drawings, and which will be fully hereinafter described and claimed.

It will be remembered that grain-elevators as now constructed consist simply of a large number of vertical rectangular bins placed side by side with a hopper at the lower end of each and with suitable mechanism for elevating the grain to the top of each bin to fill the same. Since each of these elevator-bins is a mere duplicate of all the others, I will describe and illustrate my invention as applied to but one bin.

In the accompanying drawings, forming a part of this application, the following views are shown.

Figure 1 is a perspective view of an elevated bin, showing my invention attached thereto; Fig. 2, a front elevation of the same with the perforated hopper removed and with a portion of the front cut away, so as to show the interior of the bin; Fig. 3, a side part sectional view of Fig. 4, taken on lines *x x;* Fig. 4, a top plan view with the rack moved to one side; Fig. 5, a bottom plan view of the same with the hopper B removed; Fig. 6, a sectional view of Fig. 4, taken on lines *y y*.

In all of these views corresponding parts of the apparatus are designated by identical letters of reference.

A represents a usual rectangular elevator-bin, made of wood in the customary manner.

In practice each of these bins is about seventy feet in depth, with a length and breadth of about ten feet.

At the bottom of the elevator-bin is the usual hopper B, provided at its lower end with a suitable valve. This hopper can be dispensed with, if need be; but I have found it advantageous to retain it, for the reason hereinafter explained.

Within the elevator-bin and extending from front to back is a number of thin wooden partitions C C C, arranged in pairs, so as to leave a thin air-space $a$ between the partitions of each pair and a wider receiving-space $b$ for the grain between each pair of partitions, as will be seen from an inspection of Fig. 4. Other but preferably solid partitions D D D extend from side to side of the elevator-bin, so as to divide the space within the same into a number of small vertical rectangular chambers E E E, each separated from the adjoining chambers on the sides by a thin air-space and from the adjoining chambers on the ends by a solid partition. It will be evident that the solid partitions D D D may be dispensed with and thin double partitions similar to C C C substituted instead. The partitions C C C are inclined upwardly at their lower end toward the rear of the elevator-bin.

F F F represent the wooden bottoms for the small chambers E E E, and which are secured in position by any suitable means.

It will now be seen that the chambers E E E are divided in several series, each consisting of a number of chambers, one in front of the other, and each having a common bottom. Each of these series of chambers is separated from the others by means of the air-spaces $a$ $a$ $a$. Communication is had between the chambers of these series and the adjoining air-spaces by means of a great number of minute openings $c$ $c$ $c$, which are too small to allow any grain to pass through them, but are sufficiently large for a free circulation of the air. The chambers of each series connect with each other at their lower ends either by means of a suitable opening $d$ in the lower portion of the partitions D D D, or instead by making these partitions D D D so as not to extend entirely down to the bottom F of each series of chambers. An opening G extends through the front wall of the elevator-bin, directly in line with and connecting each series of chambers, so that the contents of each series of chambers will easily flow out through said openings by reason of the incline of the bottom F.

The openings G G in turn connect with a flat hopper or chute H, secured to the front wall of the elevator-bin, so that the contents from the combined series of chambers may be deflected out of the mouth of said hopper or chute. This hopper is provided with a large number of perforations similar to the partitions C C C, so as to be thoroughly ventilated, and is also provided at its lower end with a valve $e$, by which the contents of the hopper may be retained within or allowed to flow out of the hopper or chute. As before mentioned, the hopper B, when used, is also provided with a suitable valve for a similar purpose as valve $e$.

In order that the grain may not flow into the air-spaces $a$ $a$ $a$ when the elevator-bin is being filled, I make use of a rack I, constructed so as to effectively cover such air-spaces, and thereby exclude all grain. After the elevator-bin has been filled this rack is simply moved to one side, as shown in dotted lines, thereby uncovering the small air-spaces $a$ $a$ $a$ and allowing the air to circulate through them.

The operation of the device is as follows: The rack I is first moved over the air-spaces $a$ $a$ $a$ and the valve $e$ in the perforated hopper is closed, while the valve in the hopper B, when used, is open. Grain is now elevated up to the top of the bin and emptied therein, so as to fill all the chambers E E E and the perforated hopper or chute. The rack I is now moved to one side and the air is allowed to enter from the bottom through the valve in the chute B, or through any other draft-holes that may be necessary, and to circulate freely from the bottom of the elevator-bin to the top through the air-spaces $a$ $a$ $a$. This circulation of the air can be caused merely by the natural draft through the air-spaces, or it may be forced by means of fans or blowers, either hot or cold. By thus circulating changing currents of air up through the bin the grain therein will be always kept cool and well ventilated, and by reason of the fact that the air mingles somewhat with the grain in passing through the perforated partitions all moisture and dampness will be forced out of the grain. Where the perforated partitions are made of wood, a considerable portion of the moisture from the grain will be absorbed in the wood. This moisture will be expelled by the circulating currents of air after the grain has been removed from the bin. I do not limit myself to this material for constructing the perforated partitions; but I regard it as preferable.

When the grain is thoroughly dried, the valve $e$ in the perforated hopper is opened and the grain will flow out through the same, as explained before. When the grain is in good condition and there is no need to either dry or cool it, the rack I is moved to one side, so as to uncover the air-spaces $a$ $a$ $a$, and the grain is allowed to fill the chambers E E E and the perforated hopper, as in the first instance, and also the air-spaces and the space beneath the bottoms F F and within the hopper B. When this is done, the grain within the chambers E E E is drawn out through the perforated hopper, while the remaining grain passes out through the hopper B. Considerable space is thereby economized.

It will be evident that one or more bins could be erected independent of the elevator for the use of drying grain.

Having now described my invention, what

I claim as new therein, and desire to secure by Letters Patent, is—

An improved apparatus for drying grain, consisting of an elevator-bin having a number of perforated partitions C C within the bin, each partition being made of some absorbent material, a number of partitions D D, arranged at right angles to the perforated partitions C C, so as to divide the bin into a series of compartments E E, having air-spaces $a$ between them, an inclined bottom F for each compartment, openings G G in the front wall of the bin and connecting with each compartment E E, a flat hopper H, secured to the front wall of the elevator-bin and communicating with said compartments E E through the openings G G, a valve $e$ in the hopper H, a hopper B at the lower end of the elevator-bin communicating with the air-spaces $a$ and also having a valve therein, and a sliding rack at the top of the bin and adapted to close or open the upper ends of the air-chambers $a$, substantially as set forth.

In testimony whereof I affix my signature in presence of two witnesses.

ALEXANDER McDOUGALL.

Witnesses:
FRANK L. DYER,
CHAS. R. HAINES.